C. S. REED.
DOUBLE WALLED VESSEL.
APPLICATION FILED SEPT. 17, 1907.

909,221.

Patented Jan. 12, 1909.

Witnesses.

Inventor.
Charles S. Reed
by attorneys

UNITED STATES PATENT OFFICE.

CHARLES S. REED, OF NEW YORK, N. Y., ASSIGNOR TO AMERICAN THERMOS BOTTLE COMPANY, OF NEW YORK, N. Y., A CORPORATION OF MAINE.

DOUBLE-WALLED VESSEL.

No. 909,221.    Specification of Letters Patent.    Patented Jan. 12, 1909.

Application filed September 17, 1907. Serial No. 393,804.

*To all whom it may concern:*

Be it known that I, CHARLES S. REED, a citizen of the United States, and resident of the borough of Manhattan, in the city and State of New York, have invented a new and useful Improvement in Double-Walled Vessels, of which the following is a specification.

This invention relates to double walled vessels and has for its object to provide a novel device for spacing the inner and outer walls of the vessel apart at a distance from the mouth of the vessel so that the vessel may be reinforced at such point by the said device and thus reduce the liability of the vessel to become cracked or broken.

A further object is to provide a stiffening device of the above character which is supported by the bottom of the outer wall of the vessel.

A practical embodiment of my invention is represented in the accompanying drawings, in which—

Figure 1:
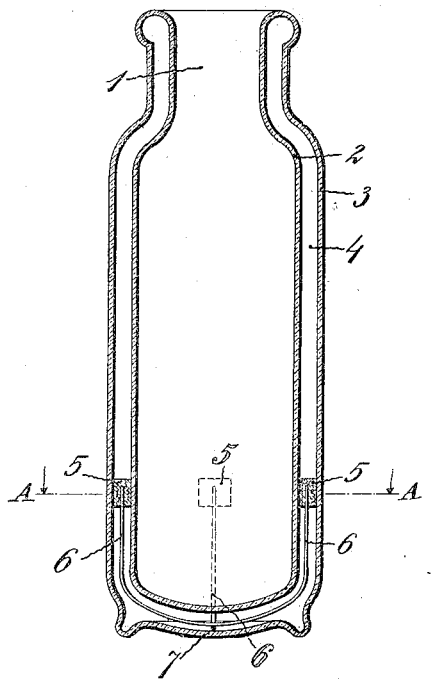
Figure 2:
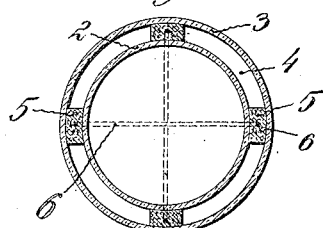
Figure 3:
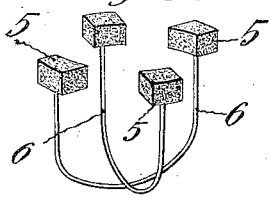

Figure 1 represents a double walled vessel with my improved stiffening device applied thereto, Fig. 2 is a transverse section taken in the plane of the line A—A of Fig. 1, looking in the direction of the arrows, and Fig. 3 is a view in perspective of the stiffening device.

The mouth of the vessel is denoted by 1, its inner wall by 2 and its outer wall by 3. These inner and outer walls are connected at the mouth of the vessel and are spaced apart at all other points. The space between the inner and outer walls of the vessel is denoted by 4 and the air is exhausted therefrom to a greater or lesser degree for preventing the rapid change in the temperature of the contents of the vessel.

The device which I have provided for spacing the inner and outer walls of the vessel apart and holding them in such spaced position at a distance from the mouth of the bottle to reduce the liability of the breakage of the bottle, comprises a plurality of blocks 5 disposed annularly in the space 4 between the inner and outer walls of the vessel, the said blocks being supported in position by wires 6 resting upon the bottom 7 of the outer wall of the vessel. In the present instance, these spacing blocks are shown as being arranged in pairs diametrically opposite to each other and each pair of blocks being supported from the bottom of the outer wall of the vessel by a wire, the ends of which are engaged with the blocks and an intermediate portion of which rests upon the said bottom 7 of the outer wall of the vessel. This arrangement permits the ready expansion and contraction of the parts due to heat and cold and at the same time stiffens the unconnected portions of the inner and outer walls at that point where it is desirable that they should be stiffened to reduce the liability of breakage in handling the vessel.

What I claim is:—

In a vacuum insulated vessel of the type set forth, a plurality of spacing blocks between the walls of said vessel, and a plurality of supporting arms for said blocks, radiating from a common junction disposed between the bottoms of said vessel.

In testimony, that I claim the foregoing as my invention, I have signed my name in presence of two witnesses, this 12th day of September 1907.

CHARLES S. REED.

Witnesses:
C. S. SUNDGREN,
F. GEORGE BARRY.